United States Patent [19]

Chiang et al.

[11] 4,289,739
[45] Sep. 15, 1981

[54] METHOD OF PRODUCING CRYSTALLINE SODIUM ALUMINUM PHOSPHATE

[75] Inventors: John S. Chiang, Mercerville; Theodore F. Munday, Kendall Park; Joseph M. Ilardi, North Brunswick, all of N.J.

[73] Assignee: FMC Corporation, Philadelphia, Pa.

[21] Appl. No.: 106,634

[22] Filed: Dec. 26, 1979

[51] Int. Cl.$^3$ ............................................. C01B 25/26
[52] U.S. Cl. ................................................... 423/306
[58] Field of Search .......................................... 423/306

[56] References Cited

U.S. PATENT DOCUMENTS

| | | | |
|---|---|---|---|
| 2,550,490 | 4/1951 | McDonald | 423/366 |
| 2,957,750 | 10/1960 | Knox, Jr. et al. | 423/308 |
| 3,205,073 | 9/1965 | Blanch et al. | 426/563 |
| 3,223,480 | 12/1965 | Vanstrom | 423/306 |
| 3,410,804 | 11/1968 | Walsh | 423/306 |
| 3,410,804 | 11/1968 | Walsh | 252/99 |
| 3,501,314 | 3/1970 | Kichline et al. | 426/563 |
| 3,554,921 | 1/1971 | Kichline et al. | 423/306 |
| 3,574,536 | 4/1971 | Vanstrom | 423/306 |
| 3,726,962 | 4/1973 | Vanstrom et al. | 423/306 |
| 3,957,679 | 5/1976 | Kichline et al. | 423/306 |
| 4,178,354 | 12/1979 | Murata et al. | 423/306 |

Primary Examiner—O. R. Vertiz
Assistant Examiner—Wayne A. Langel
Attorney, Agent, or Firm—Robert D. Jackson; Frank Ianno

[57] ABSTRACT

In the production of SALP tetrahydrate wherein sodium carbonate and aluminum hydroxide are added to aqueous phosphoric acid, the viscous reactive mixture is agitated with water to free the SALP tetrahydrate crystals from the gelatinous matrix. The crystals are recovered by filtration or centrifugation.

17 Claims, No Drawings

METHOD OF PRODUCING CRYSTALLINE SODIUM ALUMINUM PHOSPHATE

This invention relates to crystalline sodium aluminum phosphate, and in particular to an improved method of preparing it.

Crystalline sodium aluminum phosphate of the formula:

$$NaAl_3H_{14}(PO_4)_8 \cdot 4H_2O$$

also known as SALP, SALP tetrahydrate, SALP crystals, is well recognized as a leavening agent by the baking industry where it finds extensive use in baking powders, self-rising flour mixes, preleavened pancake flours and mixes, prepared biscuit mixes, prepared cake mixes, and the like. For a detailed description of the compound, reference is made to U.S. Pat. Nos. 2,550,490, 2,957,750 and 3,205,073.

In general, SALP tetrahydrate is prepared by adding a reactive trivalent aluminum compound such as the metal itself or its hydroxide and a reactive sodium compound such as sodium hydroxide or carbonate to a solution of phosphoric acid. The sodium and aluminum compounds are present in stoichiometric proportions to provide three aluminum atoms per sodium atom while there is at least sufficient phosphoric acid to react with all of the sodium and aluminum compounds. After heating the reaction at a temperature from about 70° to 110° C., there is formed a clear viscous solution which is concentrated by boiling to drive off water and cause crystallization. As water is removed, the viscosity of the solution increases and rises markedly with formation of finely divided SALP tetrahydrate crystals. Concentration is continued until crystallization is complete. The resulting product consists of SALP tetrahydrate crystals embedded in a highly viscous or even gelatinous matrix. Such unusual viscosities may be due to intense hydrogen bonding between the crystals and phosphoric acid solution. The unit of viscosity is the centipoise which is equal to 0.001 pascal second (Pa·s). Some idea of the viscous nature of the materials herein can be had by referring to U.S. Pat. No. 3,311,448, which contains the following statement at column 1, lines 52-60:

". . . The high viscosities encountered in the production of sodium aluminum acid orthophosphates are difficult to express quantitatively since they are outside of the range of ordinary viscometers (perhaps in the range of 100,000 to 200,000 centipoises). Roughly, the viscosity of the phase present immediately before crystallization in the batch process is about equivalent to that exhibited by plastic asphalts (low-petroleum volatiles types). . ."

From the foregoing, it is evident that the usual methods of separating crystals from their crystallization medium, i.e., filtration, decantation or centrifugation are not directly applicable to highly viscous sodium aluminum phosphate crystal suspensions. These materials require special handling to recover the SALP tetrahydrate; two techniques have been developed.

The first of such procedures is described in the aforecited U.S. Pat. No. 2,550,490 and is known as the methanol process. It consists of adding aqueous methanol to the viscous SALP tetrahydrate crystallization mixture under vigorous agitation. Typically about two volumes of a 75% methanol-25% water (by volume) are used. Aqueous methanol breaks up the viscous mass to give a mobile slurry of SALP tetrahydrate crystals which are readily recovered by conventional means, i.e., filtration or centrifugation. The recovered crystals are washed with aqueous methanol, then with methanol alone to remove free phosphoric acid and dried at about 70° C.

Although generally satisfactory for working up the highly viscous SALP tetrahydrate crystallization mixtures, the methanol process is objectionable in requiring the use of methanol, a highly flammable and toxic substance. In fact, FDA regulations specify that all traces of methanol must be removed from the food grade product. Moreover, the recovery of methanol from the waste stream containing phosphoric acid, about 25% dissolved SALP tetrahydrate, "white precipitates", which are hydrolytic change products of SALP, and water is difficult and could be very costly under current EPA, OSHA and FDA toxicity guide lines. Accordingly, the methanol process is not commercially viable nor is it likely to become so in the foreseeable future.

The second procedure, for recovering SALP tetrahydrate, commonly referred to as the Kneadermaster process, is described in U.S. Pat. No. 3,311,448. In this process, a conveyable reaction mixture is first prepared by heating stoichiometric amounts of alkali metal, aluminum and phosphoric acid reactants and 9.5 to 44% water until reaction is complete. The resulting mixture is then passed into a heated crystallization zone where it is concentrated to promote crystallization.

The crystallization zone must provide a kneading-conveying type of agitation whereby incoming liquid feed is quickly kneaded into a dough-like bed of SALP and slowly moved away from the point of entry. As the SALP feed passes through the crystallization zone, which is maintained at elevated temperatures, it is concentrated by removal of free water thereby causing crystallization to occur on previously introduced feed crystals. The kneading action during evaporative crystallization is provided by a kneader-conveyor device, usually of the design typified by the well known Kneadermaster and Ko-kneader. It will consist of a horizontal trough in which is located an agitator and heat exchange means, e.g., a heating jacket. The unit may be enclosed and provided with means for sweeping heated air over the bed of SALP, or it may simply comprise an open trough. The liquid feed is normally supplied near one end of the kneader-conveyor trough and crystalline product recovered from the other end. As the evaporation proceeds, the viscosity of the SALP feed greatly increases, approaching values of the order of 100,000 centipoises. Needless to say, heavy duty, powerful agitation means must be resorted to for handling the gelatinous feed. Consequently, the Kneadermaster process requires considerable capitol outlays for plant and oversized mixing equipment. This, coupled with the need for high energy input to operate such machinery constitutes serious economic objections to the Kneadermaster process. Moreover, the water content must be carefully controlled to maintain the viscosity of the initial reaction mixture at relatively low levels, i.e., 4,000 to 24,000 centipoises and to prevent formation of white precipitates. Such precipitation is suppressed in the presence of phosphoric acid. However, the Kneadermaster process cannot tolerate phosphoric acid since it would not be removed during evaporation but remain behind and thereby cause contamination of the final product.

From the foregoing, it is evident that there is considerable room for improvement in recovering SALP tetrahydrate from its reaction mixtures.

It has now been discovered that in the manufacture of crystalline acidic sodium aluminum phosphate of the formula:

$$NaAl_3H_{14}(PO_4)_8 \cdot 4H_2O$$

by contacting reactive metal compounds selected from the class consisting of a sodium compound and an aluminum compound with aqueous phosphoric acid, the sodium and aluminum compounds being in stoichiometric proportions to provide one sodium atom for each three aluminum atoms and the phosphoric acid being in excess of the amount required to react with all of said sodium and aluminum compounds, and concentrating the resulting solution to effect crystallization of the sodium aluminum phosphate, an improvement in separating the crystals of sodium aluminum phosphate from the resulting viscous crystallization mixture is achieved by rapidly diluting said mixture with water to produce a liquid suspension of said crystals in aqueous phosphoric acid and immediately recovering the crystals from the aqueous phosphoric acid.

In carrying out the process of the invention, the sodium aluminum phosphate crystallization mixture is first prepared in the known manner. Using as the active sodium and aluminum compounds, sodium carbonate and aluminum hydroxide, these are added to food grade phosphoric acid. The Na to Al ratio is 1 to 3; the $H_3PO_4$ is 5 to 150%, preferably 25 to 75%, in excess according to the formula of $NaAl_3H_{14}(PO_4)_8 \cdot 4H_2O$. The free water content is greater than 20%. $Na_2CO_3$ addition is carried out slowly at room temperature to avoid excessive foaming from the liberation of $CO_2$ and heat. After the dissolution of $Na_2CO_3$ is completed, the solution is heated to 70°-100° C. and $Al(OH)_3$ is then added at a slow rate with good agitation to avoid lump formation and/or boil over. The preparation requires about 1-2 hours; the resulting solution is clear. Crystallization is effected by concentrating the solution to evaporate water therefrom at temperatures of about 40° C. to boiling, preferably at boiling temperature. The reaction mixture boils at about 105° to 150° C.; the boiling point is proportional to the amount of excess $H_3PO_4$ used and inversely proportional to the water content. Crystallization occurs when the free water is reduced to below about 20%.

In effecting the improvement of the invention, the crystallization mixture is diluted with water accompanied by vigorous agitation. Typically, the crystallization mixture is cooled down to 80° C. and the crystal slurry is diluted with 1 to 4 parts, preferably 1.5 to 2.5 parts, by weight of water or 1–5% $H_3PO_4$, preferably water. The dilution collapses the gel that remains in the crystal slurry. To minimize the dissolution of some SALP crystals, the water or 1–5% $H_3PO_4$ is chilled to low temperatures, i.e., 6° C. prior to use, and the dilution is carried out in a mixer, i.e., Waring blender or in-line mixer for a short period of time, i.e., about 10 seconds.

After the dilution step, the crystals are separated from the mother liquor as soon as possible to minimize dissolution, washed with water, filtered and air dried. To more effectively remove the free $H_3PO_4$, the crystals separated from the mother liquor are washed by forming a crystal slurry with the washing water. This crystal slurry is then filtered and the wet cake is washed again with water by displacement. The resulting wet cake is dried with air at about 20° to 100° C., preferably at about 40°-80° C.

The mother liquor aforesaid which contains fair amounts of $H_3PO_4$ and some sodium and aluminum values, can be recycled to step 1 for making up new batches of reaction mixture. The mother liquor may be partially evaporated to remove some of the water before the recycle.

The wash liquor may be chilled, i.e., to 6° C., then recycled to dilute the crystal slurry.

The SALP crystallization and recovery process herein can be performed batchwise or continuous.

The crystallization process aforesaid can be accelerated by carrying it out in the presence of certain soluble salts such as $Al_2(SO_4)_3$, alkali metal sulfate, e.g. potassium sulfate, alkali metal phosphate, e.g. $KH_2PO_4$. With these accelerators, less water evaporation is needed to bring about crystallization and this constitutes a further advantage of the invention.

The crystallization of SALP from solutions thereof containing small quantities of extraneous salts has been described. For instance, U.S. Pat. No. 3,205,073 discloses the production of non-hygroscopic SALP by crystallizing it from solutions to which $KH_2PO_4$ is added. In U.S. Pat. No. 3,736,151 there is set forth a method of blending a small amount of $Al_2(SO_4)_3$ solution with solid acidic 1,3,8-SALP to agglomerate the particles and thereby engender a dust free product. However, so far as can be ascertained, the use herein of such salts or crystallization accelerators for SALP production has not been previously described or proposed.

It has also been ascertained that the SALP crystallization mixture is amenable to digestion whereby crystal growth is promoted and larger SALP tetrahydrate crystals are generated. Generally speaking, large, well defined crystals are preferred. Moreover, as crystal growth continues, the viscosity of the SALP crystallization diminishes and this is another advantage of the digestion treatment. It is believed that the high viscosity, at least in part, is due to the hydrogen bonding forces between the SALP crystals and the phosphoric acid molecules. These forces, and thus the degree of viscosity is reduced as the crystal surface area is decreased with the growth of larger SALP crystals.

In carrying out digestion, the crystallization mixture is subjected to a series of water removals and additions during which time some of the extremely fine crystals are dissolved and crystal growth effected.

As the water content is reduced by boiling to below a 20% water concentration, crystallization occurs resulting in a sharp increase in viscosity. When the viscosity reaches 0.2 to 0.4 Pa·s (200 to 400 cps), the boiling is stopped and the reaction mixture is maintained at 0.5° to 4° C. below the boiling point to reduce the rate of water evaporation. When the viscosity increases further to about 1 Pa·s (1000 cps), a small amount of water is added to increase the water content by 0.5-2%. The water evaporation and water addition effectively cycle the water content of the reaction mixture within a narrow range. The water addition may be carried out as many times as needed, and is dependent on the rate of water evaporation.

After digesting for 1 to 4 hours, preferred 1.5 to 3 hours, the reaction mixture is gradually cooled to 40° to 100° C., preferred 60° to 80° C., in 0.5 to 3 hours, preferred 1 to 2 hours. Digestion continues during this cooling down period; water additions are made when the viscosity reaches about 1.5 Pa·s (1,500 cps). It is not uncommon that the water content of the reaction mixture increases slightly after digestion. The digested crystallization mixture is then diluted and washed with water as above described.

Reference is now made to the following non-limiting examples.

EXAMPLE 1

40.7 g of $Na_2CO_3$ was added to 116.9 g of 77.2% food grade $H_3PO_4$ at room temperature with agitation. After dissolution was completed, the solution was warmed to 70°–100° C. and 179.5 g of $Al(OH)_3$ was then added. The $Al(OH)_3$ addition was carried out slowly to avoid lump formation and boil over. This reaction mixture took about an hour to prepare. The resulting solution contained 728.5 g of theoretical amounts of SALP, 300.7 g of excess $H_3PO_4$, which is equivalent to 50% excess $H_3PO_4$ according to the formula of $NaAl_3H_{14}(PO_4)_8.4H_2O$, and 343.1 g of free water.

The resulting clear solution was heated to boiling to evaporate water. The water vapor was condensed through a water cooled condenser. From the quantity of the condensate, the exact free water content remaining in the reaction mixture was calculated.

The solution viscosity was measured from the torque required to maintain a constant speed of a propeller at 300 RPM. The propeller was used to stir the reaction mixture.

The initial boiling point of the reaction mixture was 110° C. and the viscosity was about 0.1 Pa·s. The boiling point increased as the free water content in the reaction mixture was reduced by evaporation. When the free water was reduced to 19.4% at a boiling point of 120.5° C., crystallization occured resulting in a sharp increase in viscosity, from about 0.1 Pa·s to about 0.2 Pa·s in 2 minutes. When the viscosity reached about 0.2 Pa·s, the heating rate was reduced to stop the boiling and the reaction mixture was maintained at 120° C. for the next three hours—the high temperature digestion period.

During the digestion period, water continued to evaporate but at a lower rate, and the viscosity continued to increase. When the viscosity reached about 1 Pa·s at a free water content of 16.5%, about 10 ml water was added to the reaction mixture. The water addition reduced the viscosity to 0.7 Pa·S and increased the water content to 17.2%. During the 3 hour digestion period at 120° C., three more water additions were made. The water addition effectively maintained the viscosity to below 1 Pa·s and cycled the free water content between 16.2 to 17.2%.

After the 3 hour digestion at 120° C., the reaction mixture was gradually cooled to 80° C. in about 2 hours. During this cooling down period, about 10 ml water was added when the viscosity reached about 1.5 Pa·s. The water addition reduced the viscosity to about 0.8 Pa·s. Two such water additions were made during this period. At the end of this period, the reaction mixture was found to contain 18.1% of free water, which is greater than the 16.5% free water immediately before the first water addition.

At the end of the cooling down period, about 200 g of the crystal slurry was diluted with 400 g of 2% $H_3PO_4$ at 6° C. The dilution was carried out in a Waring blender for 10 seconds. The resulting slurry was filtered and the wet cake was washed with water by forming a crystal slurry and then filtering. The resulting wet cake was washed with water by displacement and dried in the open air. The dried crystal weighed about 67.2 g and corresponded to a yield of 58.9%. The product was identified as $NaAl_3H_{14}(PO_4)_8.4H_2O$ by x-ray diffraction.

EXAMPLE 2

A series of preparations similar to Example 1 was carried out except 1% of $Al_2(SO_4)_3$, based on the theoretical amount of SALP in the reaction mixture, was added. The presence of $Al_2(SO_4)_3$ was found to accelerate the crystallization reaction resulting in the requirement of less water evaporation to cause crystallization. In the present experiement, crystallization occurred at a free water content of 20.8%, instead of the 19.4% as was shown in Example 1.

After crystallization, digestion and cooling down to 80° C., the crystal slurries, about 40 g each, were diluted with various amounts of chilled 1% $H_3PO_4$. The SALP crystals were separated from the diluted mother liquor, water washed, filtered and air dired. Results are tabulated below.

| Example | Crystal Slurry, g | 1% $H_3PO_4$, g | Dried SALP, g | Yield % |
|---------|-------------------|------------------|---------------|---------|
| 2a | 40.1 | 40.1 | 15.0 | 63.0 |
| 2b | 40.0 | 80.1 | 15.3 | 64.4 |
| 2c | 40.2 | 120.0 | 15.4 | 64.6 |

EXAMPLE 3

An example similar to Example 1 was carried out except 1% of $KH_2PO_4$, based on the theoretical amount of SALP in the reaction mixture, was added. The presence of $KH_2PO_4$ was found to accelerate the crystallization reaction; crystallization occurred at a free water content of 26.2%, instead of 19.4% as was shown in Example 1.

After crystallization, digestion and cooling down to 80° C., about 200 g of the crystal slurry was diluted with 400 g of 2% $H_3PO_4$ at 6° C. After solid-liquid separation, the SALP crystals were water washed, filtered and air dried. The recovered crystals weighed 78.9 g corresponding to a yield of 65.3%.

EXAMPLE 4

A series of preparations similar to Example 2 was carried out except the mother liquor and the washing liquor were recycled. In this series of experiments, 618 g (350 ml) of reaction mixture was prepared to contain 341.3 g of theoretical amounts of SALP, 3.4 g of $Al_2(SO_4)_3$, 50% excess $H_3PO_4$ and 22% free water.

The reaction mixture was boiled to evaporate water to cause crystallization. After digestion and cooling down to 80° C., the crystal slurry was diluted, 100 g at a time with 200 g 1% $H_3PO_4$ at 4–5° C. The SALP crystals were separated from the diluted mother liquor, water washed, filtered and air dried.

The diluted mother liquor was partially evaporated and replenished with $Na_2CO_3$, $Al(OH)_3$ and $H_3PO_4$ to result in a new batch of reaction mixture substantially the same as the first batch. However, no replenishment of $Al_2(SO_4)_3$ was made because the diluted mother liquor contained almost all of the $Al_2(SO_4)_3$ originally added.

The new batch of reaction mixture was boiled to evaporate water to cause crystallization. After digestion and cooling down to 80° C., the crystal slurry was diluted, 100 g at a time, with 200 g of washing liquor (4°–5° C.) from the first run. The SALP crystals were separated from the diluted mother liquor, water washed, filtered, and air dried. The diluted mother liquor and washing liquor were again recycled.

Results for the amount of SALP crystal recovered, the amount of diluted mother liquor and its major constituents and the washing liquor and its major constituents in each cycle are shown below. These data show that almost all of the $Al_2(SO_4)_3$, as is indicated by the $SO_4$ values, remains in the diluted mother liquor, only the drag-out amount of $Al_2(SO_4)_3$ is lost to the SALP crystals. Analysis shows the composite SALP crystal sample from this recycling experiment contains about 0.05% $Al_2(SO_4)_3$, which is substantially less than the 1% $Al_2(SO_4)_3$ added.

| | SALP, g | | YIELD |
|---|---|---|---|
| CYCLE | FEED | RECOVERED | % |
| 1 | 341.3 | 240.0 | 70.3 |
| 2 | 329.9 | 224.7 | 68.1 |
| 3 | 352.3 | 243.5 | 69.1 |

| | DILUTED MOTHER LIQUOR | | | |
|---|---|---|---|---|
| CYCLE | g | $H_3PO_4$ % | Al % | $SO_4$ % |
| 1 | 1331 | 16.7 | .50 | .21 |
| 2 | 1243 | 17.5 | .69 | .22 |
| 3 | 1242 | 16.9 | .68 | .21 |

| | WASHING LIQUOR | | |
|---|---|---|---|
| CYCLE | g | $H_3PO_4$ % | Al % |
| 1 | 1138 | 2.3 | .11 |
| 2 | 981 | 3.3 | .22 |
| 3 | 1309 | 3.2 | .21 |

EXAMPLE 5

An example similar to that of Example 2 was carried out except the reaction mixture contained 100% excess $H_3PO_4$. The reaction mixture was boiled to evaporate water to cause crystallization. After digestion and cooling dowm to 80° C., 40 g of the crystal slurry was diluted with 100 g of water at 10° C. The SALP crystals were separated from the diluted mother liquor, water washed and air dried. The dried SALP crystals weighed 8.6 g and corresponded to a yield of 47.8%.

We claim:

1. In the method of manufacturing crystalline acidic sodium aluminum phosphate of the formula:

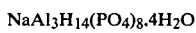

$$NaAl_3H_{14}(PO_4)_8 \cdot 4H_2O$$

by contacting a reactive sodium compound and a reactive trivalent aluminum compound with aqueous phosphoric acid, the sodium and aluminum compounds being in stoichiometric proportions to provide one sodium atom for each three aluminum atoms and the phosphoric acid being in excess of the amount required to react with all of said sodium and aluminum compounds, and concentrating the resulting solution to effect crystallization of the sodium aluminum phosphate, the improvement of separating the crystals of sodium aluminum phosphate from the resulting viscous crystallization mixture by rapidly diluting said mixture with water in the absence of added organic solvent while maintaining vigorous agitation to produce a liquid suspension of said crystals in aqueous phosphoric acid and immediately recovering the crystals from the aqueous phosphoric acid.

2. The method according to claim 1 wherein viscosity is controlled during crystallization by: (A) interrupting the concentration after crystallization is initiated and while the resulting suspension of finely divided crystals in aqueous phosphoric acid is substantially of liquid nature; (B) adding water to the suspension to dissolve a portion of the crystals and thereby promote growth of undissolved crystals, and (C) subjecting the suspension to alternate concentrations and water additions as in (A) and (B) until crystallization of the sodium aluminum phosphate is complete.

3. The method according to claim 2 wherein the excess phosphoric acid varies by weight from about 5% to about 150%.

4. The method according to claim 3 wherein the excess phosphoric acid varies by weight from about 25% to about 75%.

5. The method according to claim 2 wherein crystallization is accelerated by adding a soluble salt to the crystallization mixture selected from the group consisting of aluminum sulfate, an alkali metal sulfate and an alkali metal phosphate.

6. The method according to claim 5 wherein the soluble salt is $KH_2PO_4$.

7. The method according to claim 2 wherein the viscosity of the suspension during concentration varies from about 0.5 Pa·s to about 3 Pa·s.

8. The method according to claim 2 wherein the solution contains at least 20% by weight of water and the crystallization mixture contains about 16% to 17% by weight of water.

9. The method according to claim 2 wherein the concentration is effected by boiling the solution at essentially atmospheric pressure.

10. The method according to claim 1 wherein the excess phosphoric acid varies by weight from about 5% to about 150%.

11. The method according to claim 4 wherein the excess phosphoric acid varies by weight from about 25% to about 75%.

12. The method according to claim 1 wherein the crystallization mixture is diluted with about 1 to 4 volumes of water.

13. The method according to claim 12 wherein the crystallization mixture is diluted with about 1.5 to 2.5 volumes of water.

14. The method according to claim 1 wherein crystallization is accelerated by adding a soluble salt to the crystallization mixture selected from the group consisting of aluminum sulfate, alkali metal sulfate and a soluble alkali metal phosphate.

15. The method according to claim 14 wherein the soluble salt is $KH_2PO_4$.

16. The method according to claim 1 wherein the solution contains at least 20% by weight of water and the crystallization mixture contains about 16% to 17% by weight of water.

17. The method according to claim 1 wherein the concentration is effected by boiling the solution at essentially atmospheric pressure.

* * * * *